Jan. 11, 1927. R. W. RANSDELL Re. 16,532

COMBINATION MAGNETO CONTACT AND OIL CONDUCTOR FOR ENGINE CRANK CASES

Original Filed Feb. 1, 1921

Inventor:
Robert W. Ransdell,
by Wallace R. Lane
Atty.

Reissued Jan. 11, 1927. Re. 16,532

UNITED STATES PATENT OFFICE.

ROBERT W. RANSDELL, OF SAN DIEGO, CALIFORNIA, ASSIGNOR, BY MESNE ASSIGNMENTS, TO APCO MANUFACTURING COMPANY, OF PROVIDENCE, RHODE ISLAND, A CORPORATION OF RHODE ISLAND.

COMBINATION MAGNETO CONTACT AND OIL CONDUCTOR FOR ENGINE CRANK CASES.

Original No. 1,429,454, dated September 19, 1922, Serial No. 441,760, filed February 1, 1921. Application for reissue filed March 24, 1924. Serial No. 701,570.

My invention relates to an apparatus adapted to serve as a magneto contact and for conducting oil from one end of the crank case to the other through a by-pass outside of said crank case operative in connection with the magneto and the fly-wheel, and the objects of my invention are: first, to provide an apparatus which may be readily applied to a Ford crank case for passing the oil from the transmission end of the crank case to the opposite end; second, to provide such an apparatus a portion of which is substituted for the conventional magneto contact; third, to provide an apparatus of this class whereby the motion of the fly-wheel forces the circulation of the oil; fourth, to provide an apparatus of this class which combines the magneto contact with the oil conductor; and fifth, to provide an apparatus of this class which is very simple and economical of construction, durable, easy to install, easy to operate, and is applicable for use in connection with the conventional Ford automobile engine crank case.

Figure 1:
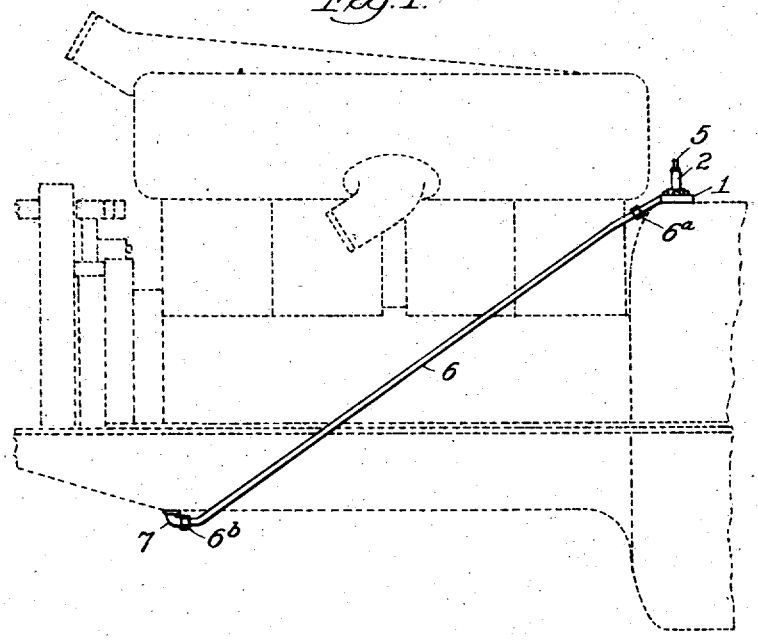
Figure 2:
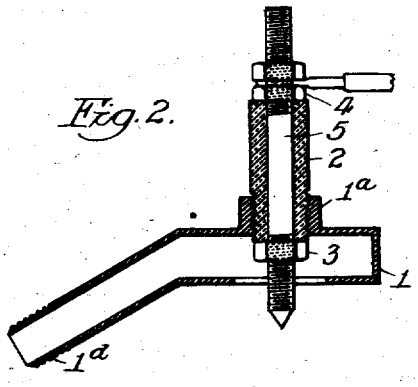
Figure 3:
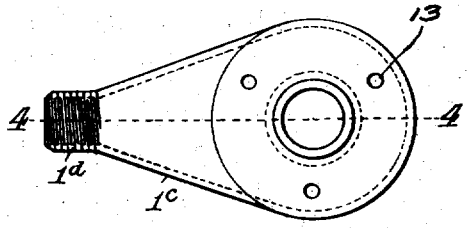
Figure 6:
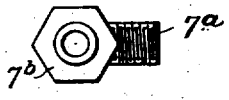
Figure 4:
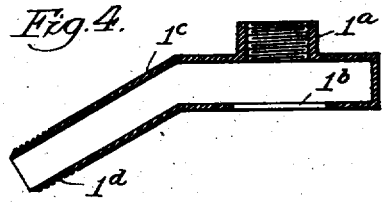
Figure 5:
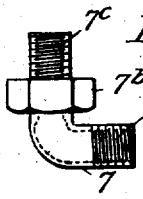

With these and other objects in view as will appear hereinafter my invention consists of certain novel features of construction, combination and arrangement of parts and portions as will be hereinafter described in detail and particularly set forth in the appended claims, reference being had to the accompanying drawings, and to the characters of reference thereon which form a part of this application in which Fig. 1 is a side elevational view of a conventional Ford autotmobile crank case, with the conventional magneto contact removed, and my apparatus positioned thereon ready for use; Fig. 2 is a longitudinal sectional view of the contact portion of the apparatus; Fig. 3 is a top or plan view of the contact support, and oil conductor connection; Fig. 4 is a sectional view thereof through 4—4 of Fig. 3; Fig. 5 is a detail of an enlarged side elevational view of the conductor connection with the front end of the crank case, and Fig. 6 is a top or plan view thereof.

Similar characters of reference refer to similar parts and portions throughout the several views of the drawings.

The magneto contact supporting member 1, insulation member 2, lock nuts 3 and 4, contact member 5, conducting tube 6, and conductor connection 7, constitutes the principal parts and portions of my apparatus.

The contact support 1, is a hollow member shaped as shown best in Figs. 2, 3, and 4, of the drawings provided with an annular lug $1^a$ on its upper side, which is internally threaded, adapted to receiving the threads on the insulation member 2, and in the lower side of said member 1, is a large hole $1^b$ to admit the oil from the crank case. The contact support is provided with an extended portion $1^c$, which is provided with threads $1^d$, adapted for connection with the conductor tube 6, by means of the nut $6^a$.

This support 1 is also provided with holes 13 adapted to receive the bolts for securing it to the casing in the conventional manner.

Secured in the insulation member 2 is the contact member 5, which is threaded at its opposite ends, adapted for the lock nuts 3 and 4 which screw on the opposite ends of said contact member and against the ends of the insulation member 2 and secure said contact member in certain adjusted position in said insulation member. This contact member 5 is provided with a pointed end adapted to engage the magneto, the same as the conventional contact, and on its opposite end is adapted to receive the terminal for an electrical circuit conductor which is secured by means of a lock nut. The oil conductor 6 extends forwardly and downwardly, outside of the engine casing and connects with the lower side of the casing by removing one of the casing cap bolts and inserting the member 7, shown in Figs. 5 and 6 in place of said bolt. This member 7 is provided with a threaded portion $7^c$ adapted for the threads in the hole from which the bolt is removed and with a hexagon portion $7^b$ adapted for a wrench and with a right angled bend threaded at $7^a$, adapted to receive the nut $6^b$ on the conductor 6 for securing said conductor 6 with the member 7, this member 7 being hollow, thus providing a conductor for conducting the oil thrown by the fly-wheel through the hole $1^b$ around the member 5, through the extension $1^c$, conductor 6 and member 7 and to the interior of the casing through the hole provided by the removal of the bolt. It will be noted that the connection formed by the nuts $6^a$ and $6^b$ are the conventional tube and nut connections.

The contact 5 is adjustable, with relation to the magneto, by the proper adjusting of the nuts 3 and 4, and limiting its movement or adjustment, as desired, is accomplished by the tightening of the nuts.

Though I have shown and described a particular construction, combination, and arrangement of parts and portions, I do not wish to be limited to this particular construction, combination, and arrangement but desire to include in the purview of my invention the construction, combination and arrangement substantially as set forth in the appended claims.

It is obvious that with this construction there is provided an apparatus, a portion of which is substituted for the conventional contact for the magneto of the Ford automobile, with means for conducting oil thrown by the fly-wheel forwardly and downwardly, outside of the casing and to the interior of said casing through a hole provided by the removal of a conventional casing cap bolt; thus providing means for conducting the oil which may be readily cleaned from the outside.

Having thus described my invention, I claim:

1. In an internal combustion engine provided with a crank case, a hollow contact support, a contact member movably mounted therein, a tube connected to said support by one of its ends and having its opposite end connected to a hole in the crank case of an engine, and means carried by said support and member for limiting the movement of the contact member.

2. In an internal combustion engine provided with a crank case, a hollow contact support, a contact member movably mounted therein, means for holding the contact member in a given moved position, a connection to be secured in a hole in the crank case of an engine, and a tube having its ends connected, respectively, to the support and the connection.

3. In an internal combustion engine provided with a crank case, a hollow contact support, an electrical contact movably mounted therein, means for holding the contact in a given moved position, insulating means electrically insulating said contact from said support, and a tube connected at one end with the support and its opposite end being adapted to be connected with the interior of a lower part of a crank case.

4. In an internal combustion engine provided with a crank case, a hollow connection adapted to be screwed into an ordinary bolt hole in the crank case of an engine, a hollow conductor connected at one end thereto and extending backwardly therefrom, an electric contact support connected to the opposite end of said conductor, and a contact member adjustably mounted in said support, means for bodily adjusting the contact member relative to the support, one end of the contact being adapted to engage a motor magneto and another portion of said contact being adapted to have an electrical conductor secured thereto.

5. In an internal combustion engine provided with a crank case, a hollow connection adapted to be secured in a conventional bolt hole in a crank case, a fluid conductor connected thereto and extending backwardly therefrom, an electrical contact support connected to the opposite end of said conductor, electrical insulating means mounted in the contact support, a contact member carried thereby and adjustably mounted in said support, means for bodily adjusting said contact member relative to the support, one end of the contact member being adapted to engage a magneto and another portion thereof being adapted to have an electrical terminal connected therewith.

6. In a lubricating attachment for a gas engine, a contact support comprising a generally flat hollow member having an opening in one face for the reception of oil, a hollow screw threaded boss on the opposite wall of the support and opposite the oil receiving opening, an insulator threaded in said boss, said support having a laterally extending hollow arm adapted to be connected to a conduit to carry off oil collecting in the support.

7. In an internal combustion engine provided with a crank case, a hollow body member having an opening on one side for the reception of an electrical contact and an opening on its opposite side through which the contact projects, an insulator for said contact member and adjustably mounted in said first named opening, said member having means on one edge for the connection of a tube thereto, in combination with an electrical contact member mounted in said insulator.

8. In an internal combustion engine provided with a crank case, a hollow contact support, a contact member, means adjustably mounting said contact member in said suport, a tube connected at one end thereof to said support and a hollow connection member, secured to the opposite end of said tube and threaded at one end and adapted to be secured in a threaded hole of the one conventional cap bolts of the crank casing.

9. In an internal combustion engine provided with a crank case, a hollow contact support, an electrical contact adjustably mounted therein, an insulation member insulating said contact from said support, and a conducting tube connected to said support and its opposite end communicating with the interior of the crank case near its front end.

10. In an internal combustion engine provided with a crank case, a special hollow connection, adapted to be screwed into the conventional bolt hole in the crank case, a conductor connected thereto and extending backwardly therefrom, an electrical contact support, connected to the opposite end of said conductor and a contact member adjustably mounted in said support, its one end adapted to engage the magneto and a terminal connected with its opposite end.

11. In an internal combustion engine provided with a crank case, a special hollow connection, adapted to be screwed into the conventional bolt hole in the crank case, a conductor connected thereto and extending backwardly therefrom, an electrical contact support, connected to the opposite end of said conductor, a contact member, adjustably mounted in said support, its one end adapted to engage the magneto, a terminal connected with its opposite end, and means for insulating said contact member from said support.

12. A lubricating attachment for Ford car engines having a crank case, an oil conduit having one end closed and provided in its side wall adjacent said end with an opening to register with the magneto plug opening in the crank case and adapted to be mounted on said case over said opening, said conduit being extended and provided at its open end with means for connection to the crank case below the cylinder.

Signed at San Diego, California, this 23rd day of February, 1924.

ROBERT W. RANSDELL.